Nov. 2, 1965       H. C. LERNER       3,215,815
SOLDERING IRON HOLDER HAVING MOLTEN SOLDER RESERVOIR
Filed Oct. 11, 1963                    2 Sheets-Sheet 1
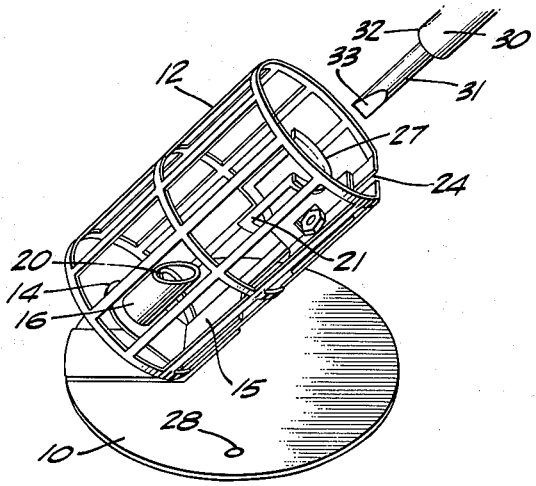
FIG. 1.
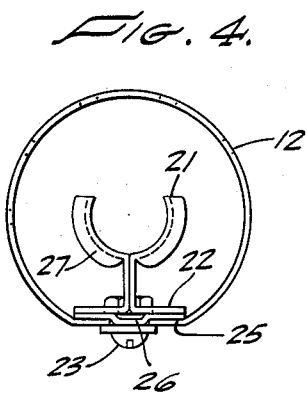
FIG. 4.
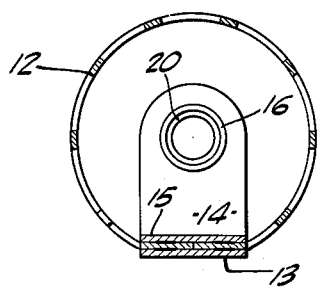
FIG. 3.
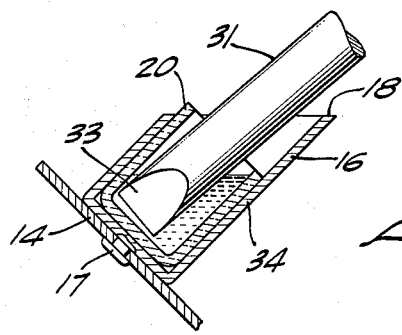
FIG. 5.
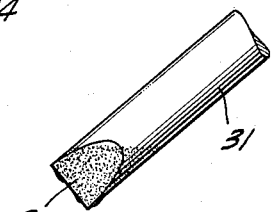
FIG. 6.
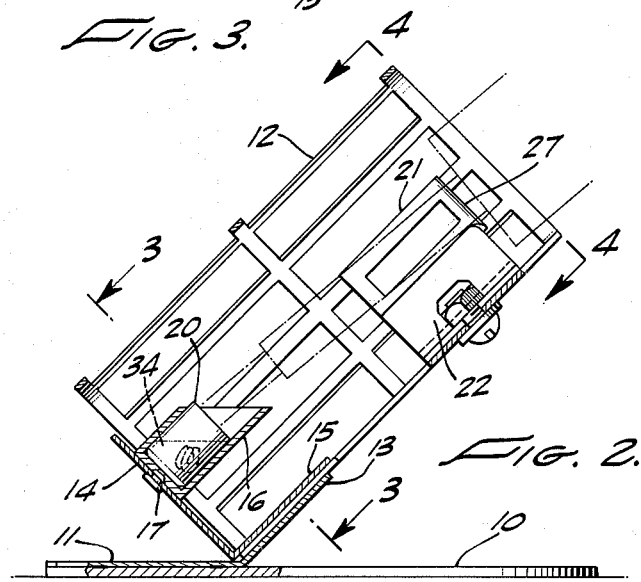
FIG. 2.
FIG. 7.
INVENTOR.
HENRY C. LERNER
BY Gene W. Arant
C. Lamen Maltby
ATTORNEYS Nov. 2, 1965 H. C. LERNER 3,215,815
SOLDERING IRON HOLDER HAVING MOLTEN SOLDER RESERVOIR
Filed Oct. 11, 1963 2 Sheets-Sheet 2
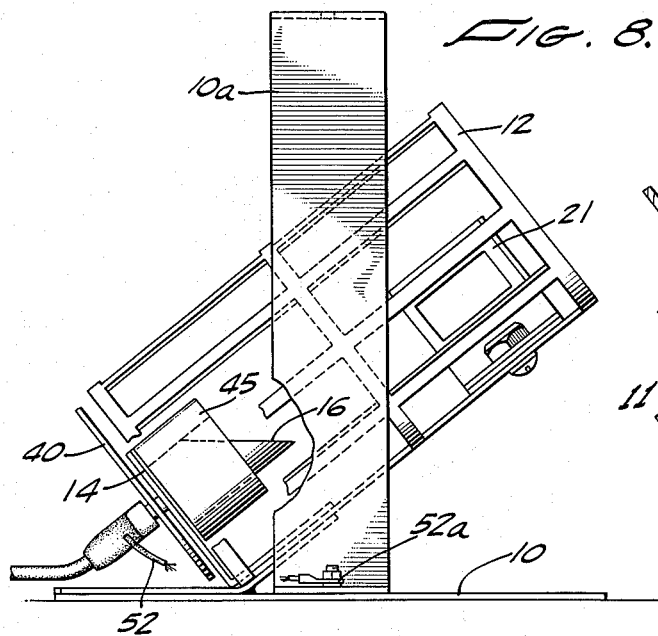
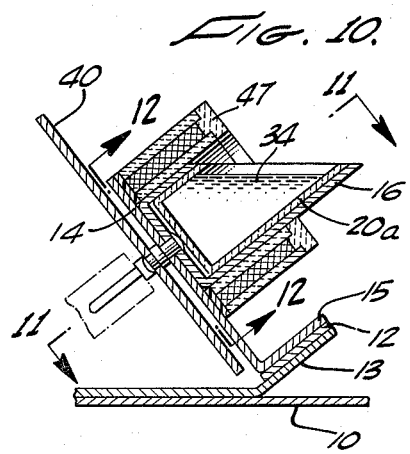
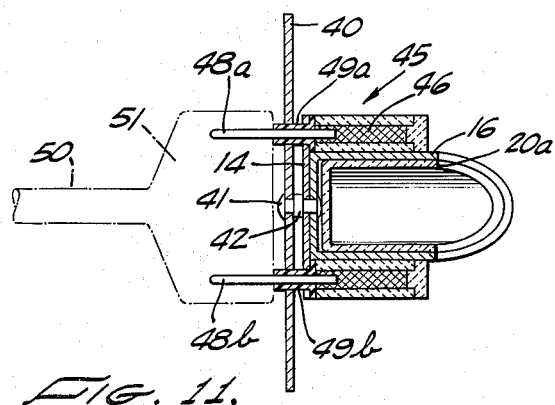
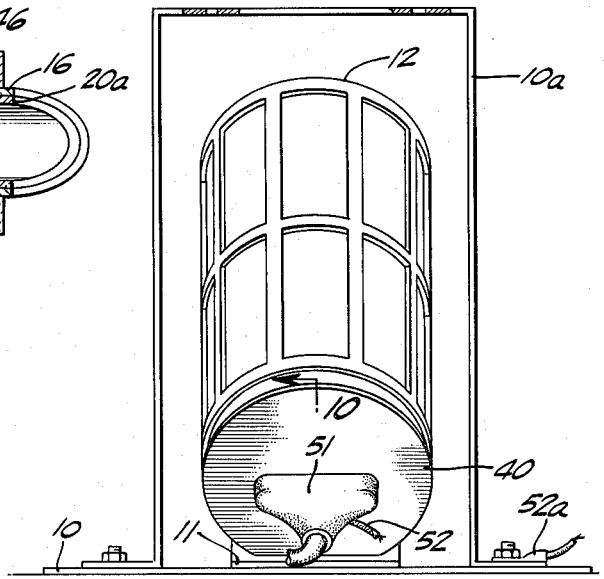
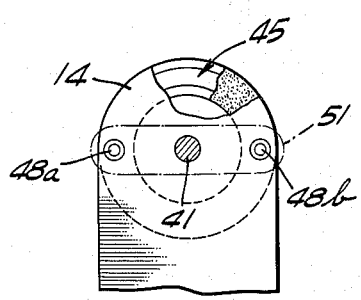
INVENTOR.
HENRY C. LERNER
BY
ATTORNEYS

United States Patent Office 3,215,815
Patented Nov. 2, 1965

3,215,815
SOLDERING IRON HOLDER HAVING MOLTEN
SOLDER RESERVOIR
Henry C. Lerner, 1024 N. McCadden Place,
Los Angeles 38, Calif.
Filed Oct. 11, 1963, Ser. No. 315,637
5 Claims. (Cl. 219—242)

This invention relates to the art of soldering and more especially to soldering iron holders.

The present application is a continuation-in-part of copending application Serial No. 221,676 filed September 4, 1962, and subsequently abandoned.

Holders for soldering irons have been highly developed and are extensively used. These holders are subject to numerous disadvantages and deficiencies, among which are that no adequate provision is made for maintaining the tip of the iron in a clean condition, or permanently tinned, and, additionally, do not provide means for maintaining a supply of molten solder ready and conveniently available for one-hand operation of the iron while holding the work with the other hand. Another disadvantage of conventional soldering iron holders is that they are not permanently affixed to a table or workbench and may be easily tipped or moved, with possible heat damage to adjacent objects or material.

With these and other shortcomings of prior art soldering iron holders in mind it is the principal purpose and objective of this invention to provide a novel and improved soldering iron holder having a reservoir of molten solder.

A more specific object of the invention is to provide improvements in a combined soldering iron holder and molten solder reservoir which permits the work to be held in one hand when taking the iron out of the holder, and which keeps the tip of the iron adequately and properly tinned at all times between the intermittent periods of its use.

Another object of the invention is to provide a novel soldering iron holder having a molten solder reservoir whereby the tip of the soldering iron does not become corroded even after many hours of continuous use.

A further object of the invention is to provide a soldering iron holder, as in the previous objects, that has improved features of safety.

Another object of the invention is to provide a soldering iron holder and molten solder reservoir combination having adjustable features permitting use with soldering irons of different sizes.

An additional object of the invention is to provide, in a soldering iron holder, a molten solder reservoir designed to prevent corrosion of the solder.

Other objects and advantages of the invention will appear and be brought out more fully in the following specification, reference being had to the accompanying drawings, in which:

FIG. 1 is a perspective view of a soldering iron holder having a molten solder reservoir embodying the present invention;

FIG. 2 is a side elevation view, partly in section, of the same;

FIG. 3 is a sectional view taken along line 3—3 of FIG. 2;

FIG. 4 is an end view as seen from line 4—4 of FIG. 2;

FIG. 5 is a partial view in section showing the molten solder reservoir and the tip of an iron in use therewith;

FIG. 6 is a separate view of the tip of the iron of FIG. 5 showing the tinned end portion thereof;

FIG. 7 is a perspective view of the glass cup reservoir shown in FIGS. 1, 2, 3 and 5.

FIG. 8 is a side elevation view of a modified and improved form of the invention;

FIG. 9 is an end elevation view of the embodiment of FIG. 8;

FIG. 10 is a fragmentary vertical cross-sectional view taken on the line 10—10 of FIG. 9;

FIG. 11 is a fragmentary cross-sectional view taken on the line 11—11 of FIG. 10; and FIG. 12 is an end view taken on the line 12—12 of FIG. 10.

Referring to FIGS. 1 through 7 of the drawings in more detail, the soldering iron holder and the molten solder reservoir of this invention is comprised of a structure having a base plate 10 to which is suitably secured as by welding a bracket member 11, the bracket being positioned adjacent to one edge of the base plate. A cage 12, which is generally cylindrical in form, is secured to an angle portion 13 of bracket member 11. A strap member 14 having a portion 15 at right angle thereto is secured within the lower end of the cage 12.

Bracket portion 11 and angle member portion 15 are secured to cage 12 in any suitable manner, as by spot welding or the equivalent. A generally cylindrical cup holder 16 is suitably secured, as by a rivet 17, to strap member 14 and has a rim or outer edge 18 which is formed at an angle of approximately 45° to the axis of the cup but is substantially parallel to the horizontal and to base plate 10 when the holder is resting or secured on a bench or table.

A rest member 21, best seen in FIG. 4, which is particylindrical in form, has a base bracket 22 which is secured to and within cage 12 by a bolt 23 which extends through a longitudinal slot 24 in the cage. A guide plate 25 is secured as by welding to the base bracket 22 and has a longitudinal rib 26 which extends into slot 24 thereby to maintain the rest member in alignment with the axis of cage 12. Rest member 21 has a shoulder 27 at its upper or outer end. As best seen in FIG. 4, rest member 21 is positioned somewhat below the longitudinal axis of cage 12.

Base plate 10 may be provided with bolts 28 for mounting screws whereby it may be secured on a table or bench. However, it may be secured to a U-shaped bracket under a table or bench is desired.

A cup 20, preferably made of Pyrex glass or other comparable material having a low thermal conductivity and high corrosion resistivity, is positioned in cup holder 16 and may be loosely contained therein or secured as by cementing if desired.

FIG. 1 shows the working-end portion of a soldering iron having a shank 30 from the shouldered portion 32 of which a copper soldering tip 31 extends. Tip 31 has a sharp end 33 which may be of any conventional shape but is shown as being a chisel point.

The operation of the invention should be clear from the foregoing description and from FIGS. 1, 2, 5 and 6. The soldering iron when inserted into the holder is supported by the rest member 21 with the shoulder 32 of the iron shank 30 abutting shoulder 27 of the rest member. When so positioned the tip 31 of the iron will extend into the cup 20 and the heat from the iron will melt the solder therein which is indicated at 34. The solder will be retained in molten condition while the iron is in the holder, and it will be observed that the point end of the tip will be kept tinned as indicated at 35 in FIG. 6. It will also be clear that the tip of the iron is maintained free from corrosion and that the solder can be lifted out by the iron from the reservoir cup 20 and permit the operator to hold the work being soldered with one hand while manipulating the iron with the other hand.

FIG. 5 shows that the end 33 of the iron will be maintained at a slight clearance from the bottom of cup 20 upon suitable longitudinal adjustment of the holder rest member 21 in the cage 12. This adjustment permits the solder iron tip to float in the molten solder, more or less. The metal cup holder 16 is provided for structural purposes only, effecting a holder for the cup 20, however, the cup may be held by other means, such as a wire structure or by cementing. The cup provides the additional function of preventing the iron from falling out of the cage.

Reference is now made to the modified and improved form of the invention shown in FIGS. 8 to 12, inclusive. One specific improvement is that the glass solder cup 20a has its upper end cut on an angle of approximately 45°, so as to lie in horizontal alignment with the upper end of the cup holder 16, and so as to have maximum storage capacity for the molten solder 34.

Another specific improvement is the addition of U-shaped bracket 10a attached to the base plate 10 and extending above the upper extremity of cage 12. The upper end of strap 10a is adapted to be fastened beneath the top of a work table while maintaining full accessibility of the soldering iron.

A third specific improvement is the addition of an electrical heating element 45 circumposed about the cup holder 16 and cup 20a. The heating element 45 includes a resistive coil winding 46 encased within an insulating housing 47. Pins 48a and 48b are connected to the ends of the winding and project rigidly out from housing 47. Electrical circuit means for energizing the heating element 45 includes a cord 50, a two-contact plug 51 adapted to engage the pins 48a and 48b, and a separate ground lead 52 which is grounded to the apparatus at 52a.

Another specific improvement is safety plate 40 which closes the lower end of cage 12 and prevents accidental projection of the soldering iron therethrough. In the embodiment of FIGS. 8 to 12 the cup holder 16 is fastened to strap member 14 by means of a center rivet 41; and the same rivet is extended downward to engage the safety plate 40 which, however, is spaced from member 14 by means of a washer 42. Suitable openings are formed in plate 40 to permit pins 48a and 48b to pass therethrough, and the pins are insulated from the plate by respectively associated insulating sleeves 49a and 49b.

In the improved form of the invention it is preferred to continuously energize the heating element 45 with a relatively small quantity of energy, for example 12 watts, which is sufficient to keep the molten solder 34 heated but which at the same time is insufficient to raise the temperature of the solder to such a point that volatile chemical constituents thereof could be boiled out. When the soldering iron is being used, and the holder is vacant, the temperature of the molten solder 34 is approximately 350° F., keeping the solder in a semi-liquid state.

The working tip of the iron is much hotter, for example, approximately 700° F. It is the conventional practice to keep the soldering iron hot throughout the working day. When the holdering iron is stored in the holder the additional heat from the working tip of the iron raises the temperature of the molten solder bath sufficiently so that it assumes a completely liquid state. There is then some smoking of the solder, but the lost ingredients do not impair the desirable quality of the remaining solder bath. Thus the soldering iron is in constant readiness for use, and when the operator picks up the iron the working tip thereof is already fully tinned with hot solder.

In accordance with the invention the cage 12 is disposed at any angle in the approximate range of 30° to 45° from the horizontal. If the cage were more nearly vertical the heat rising from the solder bath would keep the handle of the solder iron hot, causing discomfort to the operator and reduced working efficiency. On the other hand, if the cage were made entirely horizontal the solder bath could not be retained in the cup 20 or 20a.

An important feature of the invention is that the cage 12 is kept cool; this is achieved by wide spacing from the soldering iron, good ventilation, and the fact that conductivity of heat from the iron through strap 14 to the cage is very limited. It will be seen that strap 14 is an effective heat sink.

In lieu of rivet 41 it is actually preferred to use a machine screw with a Phillips head countersunk in the bottom of metal cup 16. It is also preferred to use an insulating plate for electrical insulation purposes on the under side of plate 40.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A soldering iron and solder holder comprising, in combination:
   a generally cylindrical metal cage having a single cylindrical wall with an interior diameter greately in excess of the diameter of a soldering iron to be received thereby;
   support means rigidly fastened to said cage having a surface for engagement with a work table and disposed at an angle of approximately 30 to 45 degrees with respect to the axis of said cage, the upper end of said cage being open;
   a cup rigidly supported within the lower end of said cage and opening toward the upper end thereof for containing molten solder;
   an upwardly opening, generally U-shaped rest member disposed within the upper end of said cage for receiving the shaft of a soldering iron adjacent the work tip of the iron;
   means securing said rest member to the cylindrical wall of said cage in such manner that said rest member is surrounded by said wall;
   said metal cup being substantially concentric to said cage, and said rest member being positioned somewhat below the longitudinal axis of said cage, whereby a soldering iron may be conveniently inserted within said cage and its tip immersed in molten solder within said cup while its shaft is supported by said rest member; and
   at least substantially the entire upper cylindrical half of said cage wall having an essentially open construction defining a multiplicity of relatively large openings in the cylindrical cage wall which provide a relatively obstructed view of the interior of the cage and vent heat from the cage while the cage affords protection against accidental contact with the work tip of soldering iron supported in the cage.

2. A soldering iron and solder holder according to claim 1 wherein:
   said rest member is adjustable axially of said cage and includes a rib slidably engaging in an axial slot in the lower cylindrical half of said cylindrical cage wall for guiding said rest member in its axial adjustment; and
   said rest member securing means comprises a bolt attached to said rest member and extending through said bolt and having its head located exteriorly of said cage and engaging said cage wall at opposite sides of said slot for clamping said rest member in a fixed axial position within said cage.

3. A soldering iron and solder holder according to claim 1 wherein:
   said cage has a lower end wall with an exposed external surface, said cup being mounted on said end wall; and
   an electrical heating element disposed in heat transfer relation to said cup for heating the solder therein and having terminal prongs extending through said end wall and beyond said exposed external surface thereof for connection to an electrical plug.

4. A soldering iron and solder holder comprising, in combination:

a flat base;

a first bracket having a first leg secured to the upper surface of said base and a second leg extending above the base at an acute angle thereto;

a generally cylindrical metal cage having a single cylindrical wall with an internal diameter greatly in excess of the diameter of a soldering iron to be received thereby;

means securing the lower end of said cylindrical cage wall to said second bracket leg in such manner that said cage extends upwardly from said base with the central axis of the cage disposed at an acute angle relative to said base;

a second bracket secured to the lower end of said cylindrical cage wall and extending across the lower end of said cage;

a cup mounted on said second bracket within and coaxially of said cylindrical cage wall, said cup opening toward the upper end of said cage;

an upwardly opening, generally U-shaped rest member disposed within the upper end of said cage for receiving the shaft of a soldering iron adjacent the work tip of the iron;

means securing said rest member to the cylindrical wall of said cage in such maner that said rest member is surrounded by said wall; and at least substantially the entire upper cylindrical half of said cage wall having an essentially open construction defining a multiplicity of relatively large openings in the cylindrical cage wall which provide a relatively unobstructed view of the interior of the cage and vent heat from the cage while the cage affords protection against accidental contact with the work tip of soldering iron supported in the cage.

5. A soldering iron and solder holder according to claim 4 wherein;

said second bracket has a leg secured to the same region of said cylindrical cage wall as said second leg of said first bracket, whereby said latter bracket legs may be simultaneously secured to said cage wall.

References Cited by the Examiner
UNITED STATES PATENTS

| | | | |
|---|---|---|---|
| 1,497,104 | 6/24 | Lamb. | |
| 2,174,230 | 9/39 | Shangle | 248—176 |
| 2,550,748 | 5/51 | Woltz | 219—242 X |

RICHARD M. WOOD, *Primary Examiner.*

ANTHONY BARTIS, *Examiner.*